2,888,326

PRODUCTION OF BORON HYDRIDES

William H. Schechter, Zelienople, and Ronald H. Shakely, Evans City, Pa., assignors, by mesne assignments, to Callery Chemical Company, Pittsburgh, Pa., a corporation of Pennsylvania No Drawing. Application January 7, 1953
Serial No. 330,169

13 Claims. (Cl. 23—204)

This invention relates to the production of boron hydrides, and more particularly diborane ($B_2H_6$).

Boron hydrides are known to be useful as fuels for bipropellant systems, for example in conjunction with such oxidizing agents as liquid oxygen or fluorine, hydrogen peroxide, and nitric acid. They are useful likewise as the starting material for the preparation of a variety of other boron compounds.

It is among the objects of this invention to provide a method of making boron hydrides that is simple, that makes use of inexpensive reactants, that is readily performed in a variety of ways using both dry and wet methods, that does not require elaborate or expensive apparatus, and that is particularly adapted to the production of diborane.

The invention is predicated upon our discovery that boron hydrides may be produced in accordance with the stated objects of the invention by reacting an alkali metal borohydride with a metallic halide, and separating the boron hydrides produced from the reaction products. In the practice of the invention sodium borohydride ($NaBH_4$) is the preferred alkali metal borohydride because it is the least expensive of those compounds. Likewise, although a variety of halides are available and may be used, such as cuprous chloride (CuCl), cupric chloride ($CuCl_2$), lead chloride ($PbCl_2$) and stannic chloride ($SnCl_4$), it is now preferred to use ferric chloride ($FeCl_3$). Based upon the use of those preferred reactants, it is believed that the reaction is reached by the following equation:

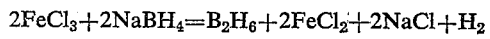

$$2FeCl_3 + 2NaBH_4 = B_2H_6 + 2FeCl_2 + 2NaCl + H_2$$

As indicated above, the reaction may be carried out in a considerable number of different ways. Considering first the dry methods, hot ferric chloride vapor may be brought into contact with solid sodium borohydride, as by disposing a body of ferric chloride in a reaction tube ahead of an appropriate amount of sodium borohydride, with the two separated by a porous medium, such as glass wool. A stream of an inert carrier gas, suitably nitrogen ($N_2$), is passed into contact with the ferric chloride while the tube is heated, so as to carry the ferric chloride vapor into contact with the borohydride. It is found that in this way boron hydrides begin to be formed at about 220° C. and above, even up to 320° C. The boron hydrides may be recovered from the effluent gases by known procedures.

Another dry method of practicing the reaction is to subject the dry reactants to agitation and attrition, suitably in a ball mill. Experience has shown that when $FeCl_3$ and $NaBH_4$ are treated in this way and heated at about 50° C., boron hydrides are evolved. Higher temperatures may, of course, be used. However, when operating at such temperatures the boron hydrides may be withdrawn from the other reaction products and recovered without the necessity for separation from other materials.

Still another dry process applicable to the invention is to otherwise heat the reactants together, for instance by addition of the borohydride to the fused metallic halide. Thus, boranes have been produced by mixing sodium borohydride with fused ferric chloride, as well as with fused chloride mixtures, examples being lead chloride with 57 mol percent of cuprous chloride, lead chloride with 63 mol percent of ferric chloride, and cuprous chloride with 60 mol percent of potassium chloride.

Considering now wet methods of practicing the invention, ferric chloride is soluble in various ethers such as diethyl ether ($Et_2O$), dibutyl ether ($Bu_2O$), Cellosolve and Carbitol, while the reaction by-products shown in the foregoing equation are substantially insoluble in them. Consequently, solutions of ferric chloride in ethers are suitably used in practicing wet methods. Thus, ether may be added to a mixture of the two solids or solid sodium borohydride may be added to a solution of ferric chloride in ether. Or, the ferric chloride solution may be added to sodium borohydride suspended in ether, and for most purposes this latter practice is preferred. Obviously, the sodium borohydride should in either instance be finely divided to expedite the reaction. Based on the boron content of the sodium borohydride used, diborane has been prepared in this manner in a 90 percent yield at minus 5° C., and with yields from 55 to 77 percent at higher temperatures, say at 20° C., and at lower temperatures, about minus 45° C. It is believed that the actual yields of diborane were higher because diborane is soluble in ethyl ether and consequently it is believed that substantial amounts of diborane were not recovered. Using dibutyl ether and a suspension of 9.8 gms. of sodium borohydride in 500 ml. of ether agitated at room temperature with a high speed dispersator blade, 45 percent of diborane, based on the borohydride used, was recovered.

When using ferric chloride the ferrous chloride produced may be reconverted to ferric chloride by chlorine. Consequently, this embodiment of the invention offers attractive economic possibilities as may be seen from the following equations, the third, or over-all, of which shows that for the production of diborane only sodium borohydride and chlorine, both inexpensive reagents, suffice:

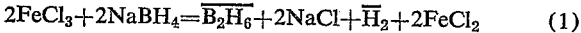

$$2FeCl_3 + 2NaBH_4 = \overline{B_2H_6} + 2NaCl + \overline{H_2} + 2FeCl_2 \quad (1)$$

$$2FeCl_2 + Cl_2 = 2FeCl_3 \quad (2)$$

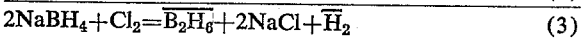

$$2NaBH_4 + Cl_2 = \overline{B_2H_6} + 2NaCl + \overline{H_2} \quad (3)$$

An attractive feature of the invention is that pure borohydrides are not necessary. Thus, there may be used sodium borohydride containing sodium chloride or sodium metaborate ($NaBO_2$) with which the borohydride is associated in its production by various methods. For instance, in application Serial No. 229,141, filed by one of us on May 31, 1951, there is disclosed the production of alkali metal borohydrides by reaction between an alkali metal hydride, e.g., NaH, with a boron halide, e.g., $BF_3$, which results in the production of a mixture of alkali metal borohydride and alkali metal halide. That application describes also reaction between alkali metal halide and boric oxide ($B_2O_3$), with production of a mixture of the alkali metal borohydride and sodium metaborate. Such alkali metal borohydrides may with economic advantage be used directly in the practice of the present invention.

For most purposes it is preferred to use about 10 to 20 percent excess of the reducible halide over stoichiometric proportions, especially in the case of wet methods. Although the invention has been described with particular reference to sodium borohydride, it will be understood from what has been said that other alkali metal borohydrides may be used instead. Likewise, from the examples given it will be seen that the invention is operable over a wide temperature range, and further that in practicing wet methods solvents other than ethers may be used, not only with ferric chloride but also in the case of other metallic chlorides that are not soluble in ethers.

According to the provisions of the patent statutes, we have explained the principle and mode of practicing our invention and have described what we now consider to represent its best embodiment. However, we desire to have it understood that, within the scope of the appended claims, the invention may be practiced otherwise than as specifically described.

We claim:

1. That method of making boron hydride comprising contacting an alkali metal borohydride in the dry state with a metallic halide of the group consisting of cuprous chloride, cupric chloride, lead chloride, stannic chloride, and ferric chloride, and collecting boron hydride thus produced.

2. A method according to claim 1, said borohydride being sodium borohydride.

3. A method according to claim 2, said halide being ferric chloride.

4. A method according to claim 1 in which heated vapor of said halide is passed into contact with said borohydride.

5. That method of making diborane comprising contacting sodium borohydride with ferric chloride, and collecting gaseous product of reaction comprising diborane.

6. A method of producing boron hydride comprising contacting an alkali metal borohydride with fused halide selected from the group consisting of cuprous chloride, cupric chloride, lead chloride, stannic chloride and ferric chloride, and recovering the boron hydride produced.

7. Method according to claim 6, said halide being $FeCl_3$, said borohydride being $NaBH_4$, and said hydride comprising $B_2H_6$.

8. A method of producing boron hydride comprising subjecting solid alkali metal borohydride and solid halide selected from the group consisting of cuprous chloride, cupric chloride, lead chloride, stannic chloride and ferric chloride, to agitation and attrition, and collecting boron hydride thus formed.

9. That method of making a boron hydride comprising reacting sodium borohydride in the solid state with a higher valence stage halide of a multivalent metal dissolved in an inert solvent in which said borohydride is insoluble, said halide is soluble, and lower valence stage of said halide is insoluble, and recovering boron hydride thus produced.

10. A method according to claim 9, said halide being ferric chloride.

11. A method according to claim 9, said solvent being an ether.

12. A method according to claim 9, said borohydride being suspended in an ether, and said halide being added thereto.

13. A method according to claim 9 in which sodium borohydride is suspended in an ether and ferric chloride is added thereto with production of diborane.

References Cited in the file of this patent

UNITED STATES PATENTS 2,461,661     Schlesinger _____ Feb. 15, 1949

OTHER REFERENCES

Bell: Quarterly Reviews (London), vol. 2, p. 138 (1948).

Hockstra et al.: Journal of the American Chemical Society, vol. 71, p. 2490 (1949).

Hackh's Chemical Dictionary: 3rd ed.; p. 864 (1950), published by The Blakiston Co., Philadelphia, Pa.